United States Patent [19]

Funkhouser

[11] Patent Number: 5,197,593
[45] Date of Patent: Mar. 30, 1993

[54] ROD AND EDGE LINK FIXATION FOR CONVEYOR BELTS

[75] Inventor: William F. Funkhouser, Mt. Jackson, Va.

[73] Assignee: Ashworth Bros., Inc., Fall River, Mass.

[21] Appl. No.: 833,026

[22] Filed: Feb. 10, 1992

[51] Int. Cl.$^5$ .............................................. B65G 17/38
[52] U.S. Cl. .................................................... 198/851
[58] Field of Search .................................. 198/851, 853

[56] References Cited

U.S. PATENT DOCUMENTS

| | | |
|---|---|---|
| 240,819 | 5/1881 | Ewart . |
| 610,751 | 9/1898 | Wood . |
| 891,189 | 6/1908 | Schmidt, Jr. . |
| 2,264,529 | 11/1940 | Herman . |
| 2,681,728 | 6/1954 | Boron . |
| 2,986,387 | 5/1961 | Illing . |
| 3,853,526 | 12/1974 | Hochart . |
| 3,985,224 | 10/1976 | Harvey . |
| 4,143,512 | 3/1979 | Templin . |
| 4,709,807 | 12/1987 | Poerink . |
| 4,776,454 | 10/1988 | Momose . |
| 4,863,418 | 9/1989 | Fillar et al. . |
| 4,911,681 | 3/1990 | Funkhouser . |
| 4,932,927 | 6/1990 | Fillar . |

FOREIGN PATENT DOCUMENTS 898938 6/1962 United Kingdom ................. 198/851

OTHER PUBLICATIONS

Matsumoto Kinzoku Kogyo Co., Ltd. "Ceramic Conveyor Belts." (no date given).
Kyocera Corporation "Ceramic Link Belt," Mar. 4, 1988.

*Primary Examiner*—D. Glenn Dayoan
*Attorney, Agent, or Firm*—Banner, Birch, McKie & Beckett

[57] ABSTRACT

An end fixation for a ceramic conveyor belt, including a plurality of ceramic bars interconnected by a plurality of interconnecting rods disposed through holes formed in the ceramic bars such that each bar is interconnected by two rods is disclosed. The end fixation holding the bars on the rods comprises an indentation formed about both ends of the interconnecting rods, and a ceramic edge link disposed adjacent the outermost of the ceramic bars. The edge links have a longitudinal channel disposed therethrough, the channel being defined by a ledge and including an enlarged opening through which the ends of the interconnecting rod may be passed to allow the edge links to be disposed on the rod. The ledge fits within the indentation to retain the edge links on the rods. Also provided is a structure for preventing the enlarged opening from aligning with the rods after the edge links are disposed on the rods to preclude the edge links from falling off of the rods.

14 Claims, 6 Drawing Sheets

FIG. 2
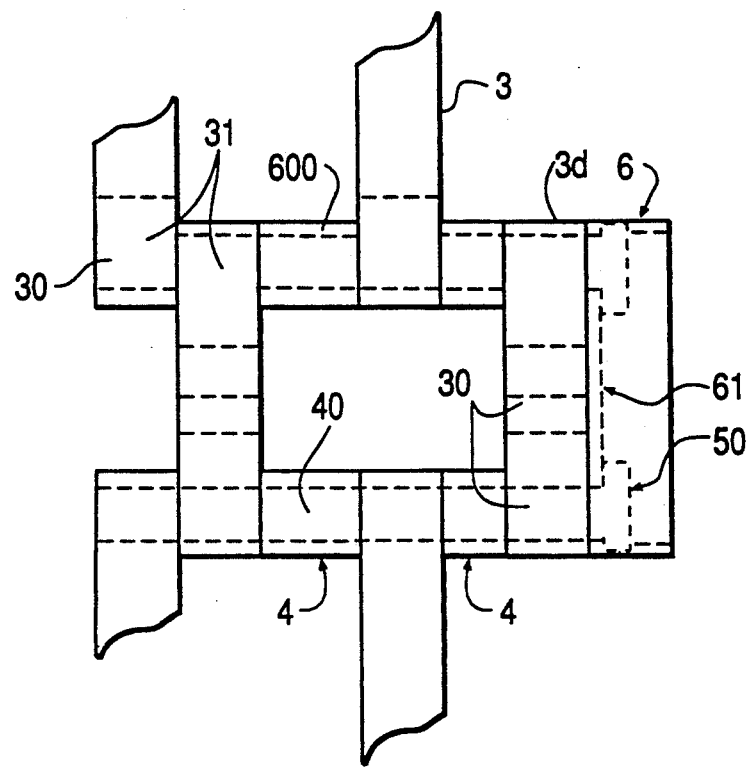
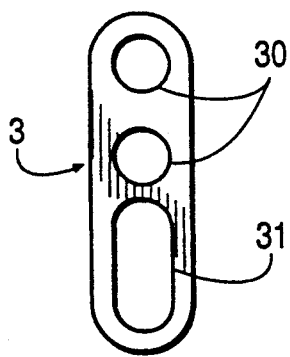
FIG. 3
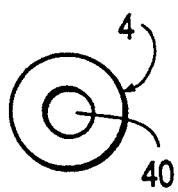
FIG. 4a
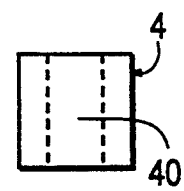
FIG. 4b
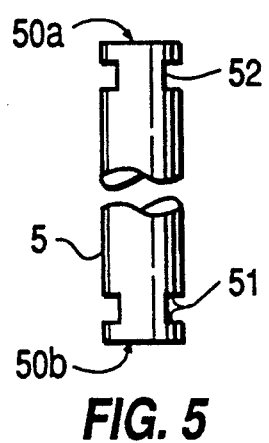
FIG. 5

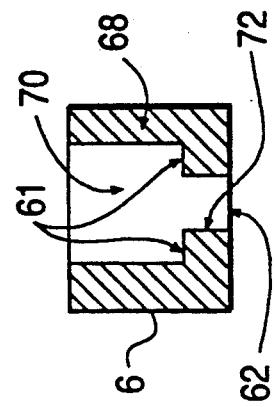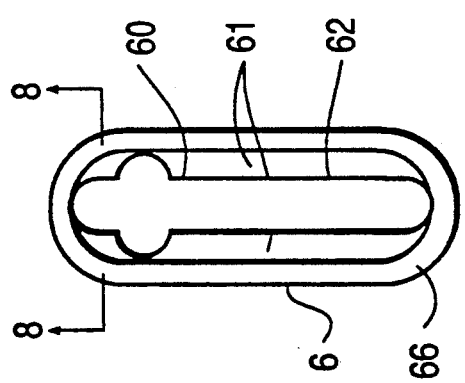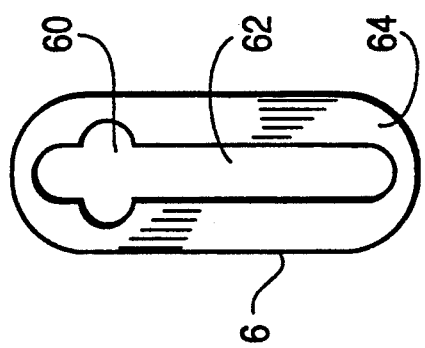

ROD AND EDGE LINK FIXATION FOR CONVEYOR BELTS

TECHNICAL FIELD

The present invention is directed to a ceramic conveyor belt, and more particularly to an end fixation for securing the outer ceramic bars of the conveyor belt on ceramic cross rods.

BACKGROUND OF THE INVENTION

Continuous ceramic conveyor belts for use in processing items which are subjected to extremely high temperatures are known in the art. The ceramic belts convey the articles through a high temperature environment, or through other environments which would prove chemically destructive to metal or fabric belts. Prior ceramic belts have been manufactured either entirely of ceramic material, or only partially of ceramic material. Belts manufactured partially of ceramic materials can operate only within a limited temperature range, whereas belts manufactured entirely of ceramic materials have been limited by machining difficulties.

U.S. Pat. No. 2,986,387 to Illing discloses a ceramic belt for use in carrying tile or other types of ceramic ware through a tunnel kiln which is fired at a high temperature. The ceramic belt is formed partially of ceramic material and includes individual ceramic links interconnected by refractory metal cross rods. The ceramic links are elongated and have rounded ends with apertures extending transversely through the links at opposite rounded ends. The links are disposed in cross rows in a staggered relationship such that the forward end of one link is disposed between the adjacent and rearward ends of two links disposed in the preceding row. Similarly, the rearward end of the first link is disposed between adjacent forward ends of two other links disposed in the preceding row. The apertures of the links are aligned to create a plurality of parallel cross-passages extending through the belt. Thus, the ceramic belt includes a plurality of columns or strips, each strip including a plurality of spaced links.

The refractory metal cross rods are disposed through the cross-passages, and have ends extending beyond the sides of the outermost links of the belt. A bore extends transversely through the rods at the extending ends. End caps are disposed on the extending ends of the rods, and include openings which are aligned with the corresponding bores in the rod. A refractory metal retaining pin is inserted in the opening and extends through the bore. An air-setting refractory cement is plugged into the opening over the end of the pin to prevent the pin from escaping from the bore after the cement matures. Insertion of the pins thereby holds the cap on the extending end to hold the ceramic belt together.

However, since the belt of Illing is made only partially of ceramic material, the temperature range in which the belt can be used is limited by the usable temperature range of the non-ceramic, refractory metal. For example, the operative temperature range of the refractory metal is disclosed in the Illing patent as 1600°-2400° F. However, current high temperature processing can occur up to 4000° F. Thus, in the disclosed structure of Illing the metal pin would be likely to melt at the desired extreme temperatures. Furthermore, in order for the refractory cement to perform the function of preventing escape of the pin, it would have to be bonded in the hole or else the cement plug would simply fall out. In practice, it is difficult to bond cement material to ceramic material and operate at the temperature range of 4000° F.

Belts made totally of ceramic material overcome the temperature limitations of partial ceramic belts. However, ceramic materials which are suitable for use at these elevated temperatures are extremely hard in the fired or usable state. Machining the components after firing to provide a conventional means of holding the belt assembly together is either impossible, or at best, extremely difficult and economically unfeasible. For example, due to the small size of the cross rods and their circular cross sections, it is extremely difficult to drill holes in the cross rods if a cotter pin mechanism is to be used.

Due to the difficulty of machining fired ceramic components, previous attempts to make ceramic conveyor belts have involved either machining an edge fixation into the components in their "green" or unfired state when the components are extremely fragile, or making a belt without a mechanism for holding the edges of the belt together. The width of a ceramic belt with components machined in the "green" state has been limited by the fragility of the "green" components which had to be of a relatively small size in order to be handled and machined without excessive breakage. Using "green" components also has resulted in large quantities of scrap and has prevented stocking of belt components or repair parts until after an order had been placed identifying the specific size of belt required. A drawback of running a belt with unconnected components is that the components have a tendency to spread apart due to unwanted movement perpendicular to the direction of the belt drive, or disengage entirely from the belt.

In addition to the above problems in forming end fixations on ceramic belts, reliability problems have occurred in prior ceramic belt end fixation techniques. For example, when a conventional mechanical interlock such as a cotter pin or a threaded nut was used, the pins and nuts frequently became loose after a period of time. When glued or bonded components have been used, the reliability of the bond has been very limited in the high temperature range within which ceramic conveyor belts operate.

SUMMARY OF THE INVENTION

The invention is directed to an end fixation for a ceramic conveyor belt where the belt comprises a plurality of ceramic bars interconnected by a plurality of interconnecting rods disposed through holes formed in the ceramic bars such that each bar is interconnected by two rods. The end fixation holds the bars on the rods, and comprises an indentation formed about both ends of the rods, and a ceramic edge link. The ceramic edge link is disposed adjacent the outermost of the bars, and has a longitudinal channel disposed therethrough. The channel is defined by a ledge and includes an enlarged opening through which the ends of the rods may be passed to allow the edge links to be disposed on the rods. The ledge defining the channel fits within the indentation formed about the ends of the rods to retain the edge links on the rods. The end fixation further comprises a mechanism for preventing the enlarged opening from aligning with the rods after the edge links are disposed on the rods to preclude the edge links from falling off of the rods.

The present invention further is directed to an end fixation for a ceramic conveyor belt which does not carry any significant portion of the load of the tension produced in the belt. The end fixation further comprises a mechanism, such as the tension in the belt, which prevents the enlarged opening of the outermost ceramic bar from aligning with the ends of the rod, and thus disengaging the end fixation.

Further objects, features and other aspects of this invention will be understood from the following detailed description of the embodiments of this invention, with reference to the drawings.

BRIEF DESCRIPTION OF THE DRAWINGS

FIG. 2 is an enlarged view of a portion of the conveyor belt shown in Circle (A) in FIG. 1.

FIG. 3 is a side view of a ceramic bar used in the conveyor belt.

FIG. 4a is a top view of the spacer, and FIG. 4b is a side view of the spacer.

FIG. 5 is a split side view of a connector rod of the present invention.

FIG. 6 is a side view of an edge link used in the present invention.

FIG. 7 is an opposite side view of an edge link used in the present invention.

FIG. 8 is a cross-sectional view along line 8—8 shown in FIG. 7.

DETAILED DESCRIPTION OF THE INVENTION

Figure 1:
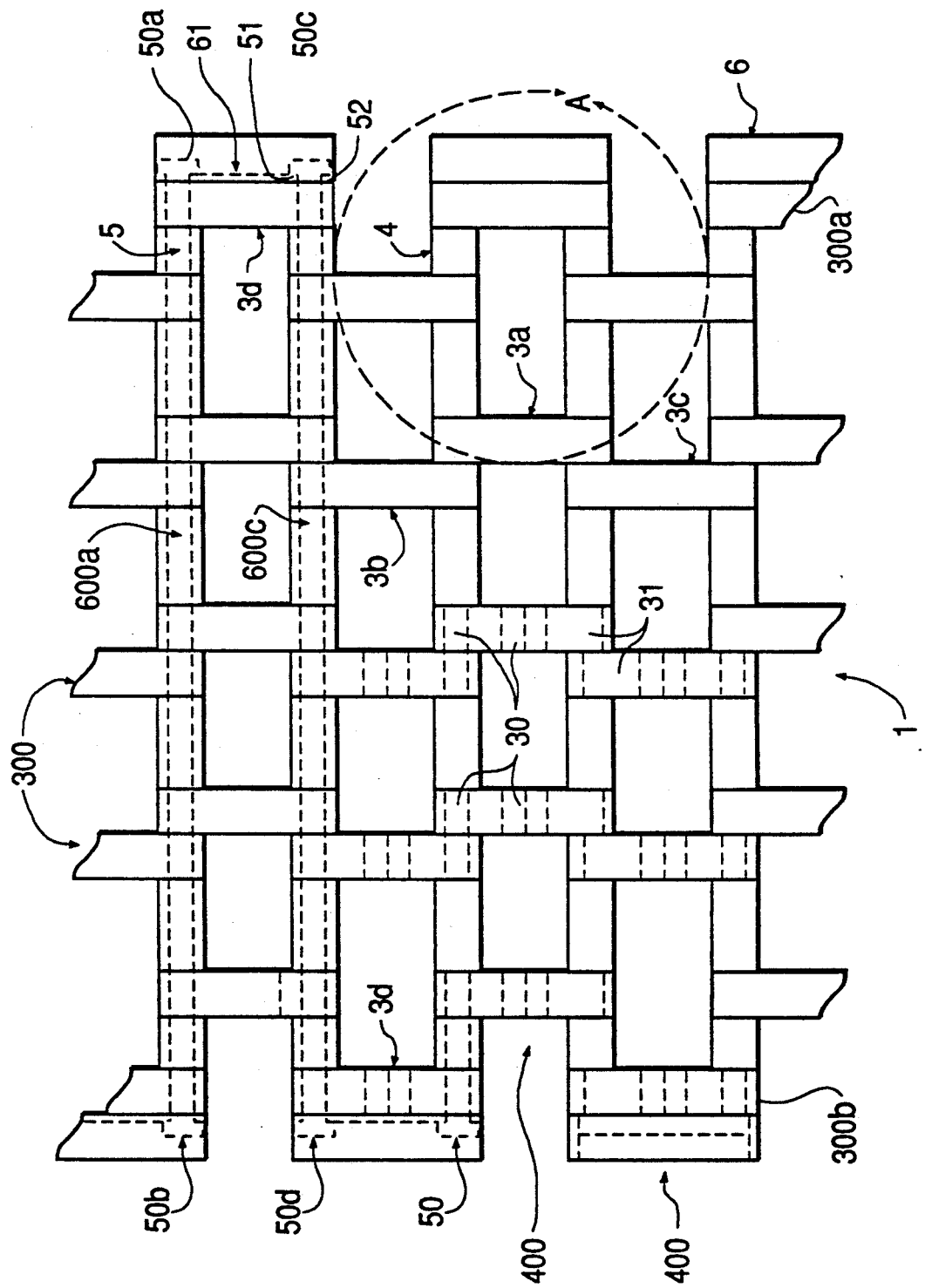
FIG. 1 is a top plan view of a portion of a ceramic conveyor belt including the connector rod end fixation edge links of the present invention.

In the separate drawings, like numerals represent like elements.

With reference to FIGS. 1-6, ceramic belt 1 includes a plurality of ceramic bars 3 disposed in a plurality of continuous strips or columns 300, wherein columns 300 may be spaced from one another by the staggered arrangement of the ceramic bars 3, and ceramic spacers 4. Alternatively, spacers 4 may be eliminated and only the staggered arrangement of ceramic bars 3 of columns 300 will define the belt surface. Bars 3 and spacers 4 are connected by connecting rods 5 and secured in position by ceramic edge links 6. The ceramic bars 3, spacers 4, connecting rods 5, and edge links 6 are preferably formed of silicon carbide or other ceramic materials with a suitable resistance to thermal shock or thermal cycling, including, but not limited to zirconia or silicon nitride.

Bars 3 generally are oval shaped with rounded ends. Two similar round holes 30 and a longitudinal hole 31 are formed through bars 3. As an example only, the dimensions of the bars may be: 2.75" long, 0.75" wide, and 0.25" thick. The similar round holes 30 may have a diameter of 0.255", preferably slightly larger than the diameter of connecting rod 5. The width of longitudinal hole 31 may be 0.255", and the length may be 0.75". The middle hole 30 preferably is at the center of the bar 3, and the distance from the edge of the bar adjacent the rearward side of forward hole 30 to the center of the middle hole 30 may be 0.875", and the distance from the edge of the bar adjacent the forward side of rearward longitudinal hole 31 to the center of the middle hole 30 may be 0.438". Skilled practitioners recognize that these dimensions may vary depending on the size of rods 5 used, the tension to be carried by ceramic conveyor belt 1, and other known result-effective design parameters.

Bars 3 are disposed in a plurality of offset rows 400 as shown in FIG. 1 such that the bars in each row are spaced from each other. For convenience of description, the forward end of bar 3 is defined as the end where round hole 30 is disposed, and the rearward end of bar 3 is defined as the end where longitudinal hole 31 is disposed. Accordingly, the forward end of one bar, for example, bar 3a is disposed adjacent the forward end of bar 3b disposed in the adjacent forward row. The forward hole 30 of bar 3a is aligned with the forward hole 30 of bar 3b. Similarly, the rearward hole 31 of bar 3a is disposed adjacent the rearward hole 31 of bar 3c disposed in the preceding row. The longitudinal holes are aligned so that the rearward-most edge of the longitudinal hole 31 of bar 3a and the rearwardmost edge of the longitudinal hole 31 of bar 3c form a channel 600 equal in diameter to the channel formed by the alignment of the round holes 30 of bars 3a and 3b. Bar 3c is on the same side of bar 3a as bar 3b. In this manner, a continuous strip or column 300 of staggered bars 3 is created.

The ceramic belt is comprised of a plurality of strips 300 which are separated by ceramic spacers 4 disposed adjacent the ends of each bar 3, for example bar 3a, on the side opposite from bars 3b and 3c. Holes 40 are formed through ceramic spacers 4 and are aligned with the holes through bars 3 such that the plurality of continuous cross-channels 600 are created as shown in FIG. 2. As an example only, the dimensions of spacers 13 may be 0.75" in outer diameter, and 0.255" in inner diameter, i.e., the diameter of hole 40. The thickness of spacers 4 may be 0.25", 0.375", or 0.5" depending upon the particular application of the conveyor belt. Although the spacers are shown as having a circular exterior cross section, any suitable shape may be used.

With reference to FIGS. 1, 2, and 5, ceramic connecting rods 5 have a circular cross-section and are disposed through channels 600 created by the adjacent holes of bars 3 and spacers 4. Thus, each row 400 of bars 3 is disposed upon two connecting rods 5. Each rod 5 includes ends 50a and 50b which extend beyond the outermost columns 300a and 300b of bars 3 of the ceramic belt, that is, on the outer side of outermost bars 3d.

Indent 52 is formed about the ends of 50a and 50b of rods 5, and defines surface 51. As an example only, the diameter of rods 5 may be 0.245", or any diameter less than the diameter of round hole 30 and longitudinal hole 31. Due to the fact that fired ceramic rods 5 may be used instead of those in the "green" state, the length of rods 5 is not critical, and is a matter of design preference depending on the desired width of ceramic conveyor belt 1. Indent 52 may have a diameter of about 0.175" and is slightly less than the width of longitudinal channel 62 of edge link 6.

Edge links 6 are disposed adjacent the outer surface of outermost bars 3d, and serve to secure bars 3 on rod 5. With reference to FIGS. 6, 7, and 8, edge links 6 generally are oval shaped with rounded ends. As an example only, the dimension of the edge links may be: 2.75" long, 0.75" wide, and 0.25" thick. Preferably, edge links 6 have essentially the same dimensions as bars 3. Edge links 6 include flat inner surface 64, that is, the surface which in use is in contact with the outer surface of the outermost bar 3d of a row 400. Edge links 6 also include outer surface 66, which also is essentially flat, but which curves at the periphery into side surface 68. Generally oval-shaped opening 70 extends through edge link 6, inwardly from outer surface 66, and towards inner surface 64. Projecting ledge 72 is formed at inner surface 64, extending generally within the cross-section defined by oval shaped opening 70. Ledge 72 includes a keyhole shaped opening defined by longitudinal channel 62 which expands into generally circular shaped opening 60. Ledge 72 defines inner surface 64 on one side, and extending surface 61 on the other side. The enlarged circular opening 60 may have a diameter of 0.255", preferably slightly larger than the diameter of connecting rod 5. Longitudinal channel 62 may have a width of 0.215", and an overall length of about 2.25" including circular opening 60. This length is preferably slightly greater than the distance between adjacent rods 5 as defined by the locations of channels 600.

Projecting ledge 72 preferably is flush with flat inner surface 64, and may be about 0.10" thick. The 0.10" thickness of ledge 72 preferably is slightly less than the distance between end 50 and rod 5 formed by indent 52, which may be about 0.125". The depth of oval-shaped opening 70 preferably is larger than the thickness of end 50 of rods 5 so as to prevent ends 50 from protruding outwardly from ceramic belt 1. End 50 may be about 0.125" thick and the depth of oval-shaped opening 70 may be about 0.15". The width of oval-shaped opening 70 may be 0.255", and surface 61 of ledge 72 may be about 0.04" wide.

Accordingly, the ends of connecting rods 50 are disposed through circular opening 60 of edge link 6 with indent 52 fitting within channel 62 to allow rod 5 to be slid to the end of edge link 6. Surface 51 of indent 52 of connecting rod 5 rests upon surface 61 of ledge 72. Skilled practitioners will be able, with the guidelines presented herein, to design the bars 3, connecting rods 5, edge links 6, and spacers 4 for their intended application. For example, if the intended application requires the use of a thicker connecting rod 5 to carry a greater tension, the bars 3, edge links 6, and spacers 4 can be redesigned to accompany the larger connecting rod.

With reference to FIGS. 6, 7 and 8, the manner in which ends 50a and 50b of rods 5 are disposed along the channels of edge link 6 can be seen. The diameter of hole 60 is slightly larger than the diameter of end 50 of rod 5 to permit the rod to pass through the hole. The width of longitudinal channel 62 is slightly larger than the diameter of rod 5 at indent 52, but smaller than the diameter of end 50, which is substantially equal to the diameter of the rod. By virtue of the differences in these diameters, end 50 can pass through opening 60, allowing edge link 6 to slide back and forth along longitudinal channel 62 with the surface 51 of indent 52 disposed outwardly of outer surface 61 of projecting ledge 72.

Figure 9:
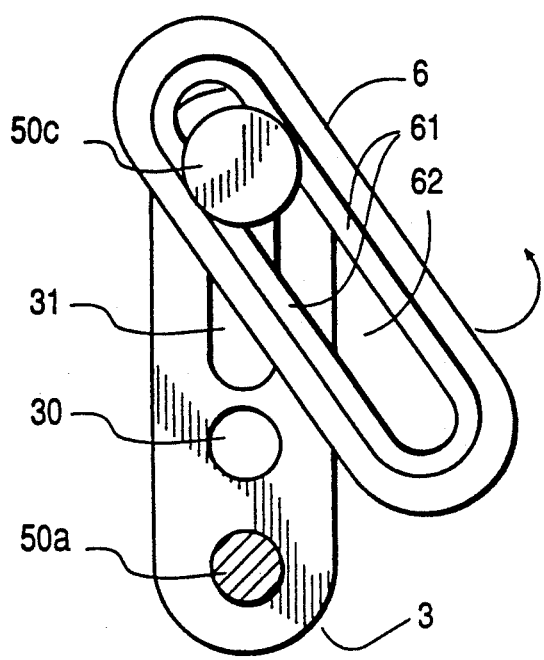
FIG. 9 shows an edge link of FIG. 6 being placed on a ceramic bar of FIG. 3 by permitting the end of a connecting rod of FIG. 5 to pass through the enlarged portion of the longitudinal opening of the edge link. The arrow represents the direction the edge link will turn about its end axis in order to additionally secure an adjacent connecting rod.
Figure 10:
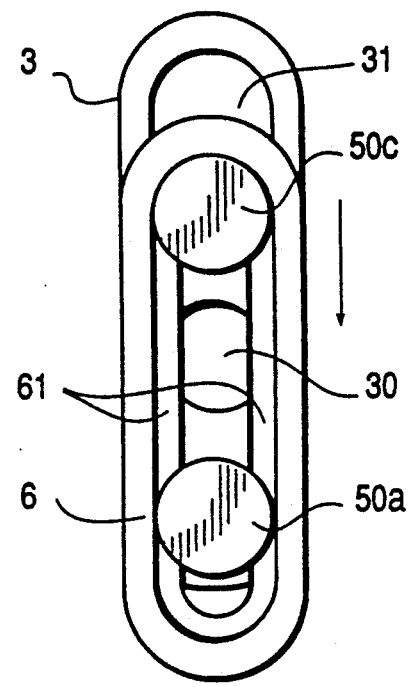
FIG. 10 shows the next step in securing the adjacent connecting rod. The arrow represents the direction the edge link will slide along the groove and the rod will slide along the longitudinal opening in the bar in order to permit the end of an adjacent connecting rod to pass through the enlarged portion of the longitudinal opening of the edge link.
Figure 11A:
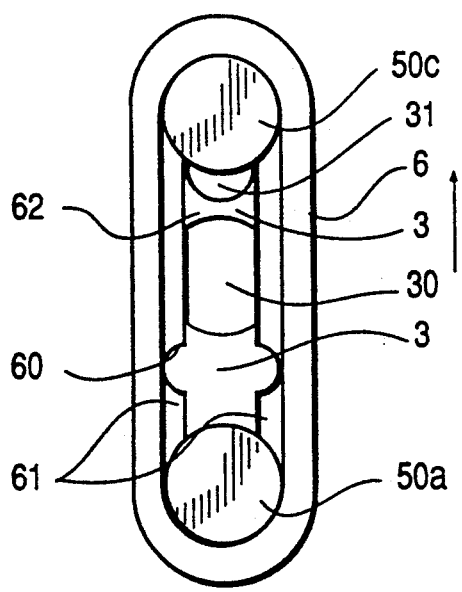
FIG. 11 shows the final step in securing the adjacent connecting rod. The arrow represents the direction the edge link will slide along the groove in order to firmly secure both ends of adjacent connecting rods.
FIG. 11b is a top plan view of FIG. 11 including cement putty.

With reference to FIGS. 9, 10, and 11, it can be seen how the outermost bars 3d of each row 400, can be secured upon connecting rods 5 by a single edge link 6 on each end. First, end 50c, of rod 5, is passed through circular opening 60 in edge link 6. End 50c of rod 5 also passes through the longitudinal opening 31 in outermost ceramic bar 3d. Edge link 6 then can be rotated about end 50c in the manner shown in FIG. 9. After rotating edge link 6 so that the part of longitudinal channel 62 adjacent enlarged opening 60 is nearer end 50a of rod 5, edge link 6 then can slide toward end 50a of the adjacent rod 5 on the manner shown by the arrow in FIG. 10. Edge link 6 is allowed to slide a distance that permits enlarged opening 60 to be placed directly over end 50a. Connecting rod 5 also may slide in longitudinal hole 31 of bars 3. As discussed above, ceramic bars 3 are positioned so that the longitudinal holes 31 of the bars 3 in each horizontal channel 600 are aligned with each other. Thus, every other channel 600 is permitted to move a distance equal to the length of the longitudinal hole 31 of bar 3 with respect to the adjacent row to allow connecting rod 5 and the edge link to move the required distance.

After edge link 6 has slid the required distance so that circular opening 60 is placed directly over end 50a, end 50a is passed through circular opening 60. Edge link 6, along with end 50c and the rest of the channel 600 disposed adjacent thereto, then are allowed to slide in the direction of the arrow in FIG. 11 to bring the edge link directly beside bar 3d. The same procedure is carried out on the other side of the conveyor belt beginning with end 50d passing through hole 60 of edge link 6. However, edge link 6 will be rotated in the opposite direction, and the channel 600 adjacent thereto may be moved in the opposite direction, that is, toward the adjacent rearward channel 600. Thus, as can be seen in FIG. 1, edge links 6 are secured on bars 3d to form alternating rows 400 on the belt 1.

At the opposite side of the belt, end 50 of rod 5 of the adjacent rearward channel 600 also will be closer to enlarged opening 60 of edge link 6. After edge links 6 are seated on the ends of both rods, circular openings 60 of edge links 6 are closer to the ends 50a and 50b of the rod 5 which had passed through the round opening 30 of outermost bar 3d. In other words, as shown in FIG. 11, opening 60 of links 6 will overlap a solid portion of the outermost bars 3d. This configuration will prevent the ends 50 from sliding along channel 62 and possibly disengaging through circular opening 60. Tension of the conveyor belt also will keep the bars from separating or disengaging from the belt. In one embodiment of the invention, the length of channel 62 is slightly longer than the distance, (i.e. the pitch), defined by the distance between channels 600a and 600c in FIG. 1. This configuration will keep edge link 6 from bearing any significant portion of the load produced by tension in the belt. That is, substantially all of the driving force of the belt is transferred from one row of bars to the next, through connecting rods 5, and substantially none of the driving force is transferred through edge link 6.

Edge link 6 also may be designed to prevent the ends of the rods 50 from protruding outwardly from the conveyor belt. With reference to FIG. 8, it can be seen that the depth of edge link 6, defined by opening 70 may be greater than the length of the ends of rods 50, thus preventing ends 50 from extending beyond outer surface 66, and thus protruding outwardly from conveyor belt 1.

Figure 12:
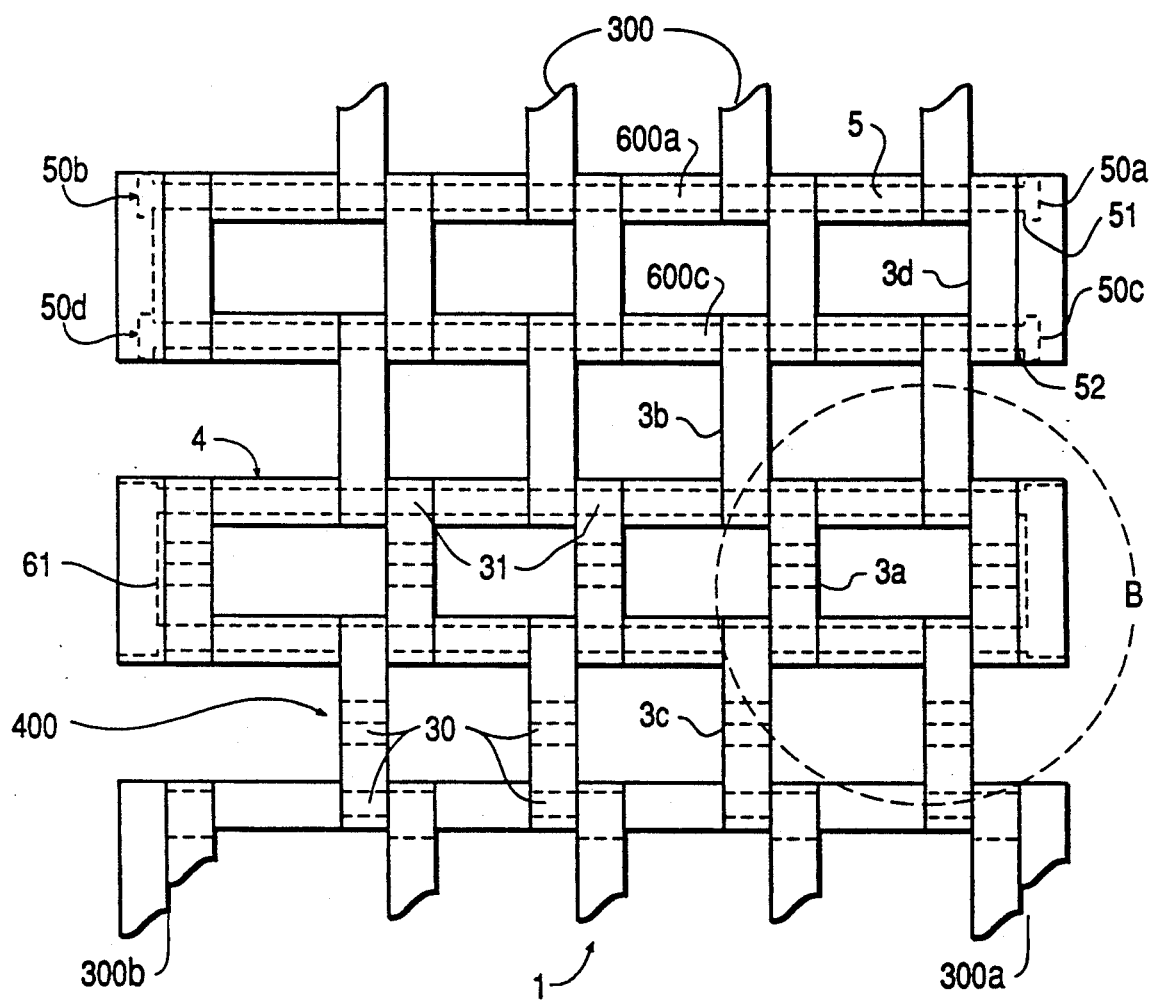
FIG. 12 is a top plan view of a ceramic belt according to a second embodiment.
Figure 13:
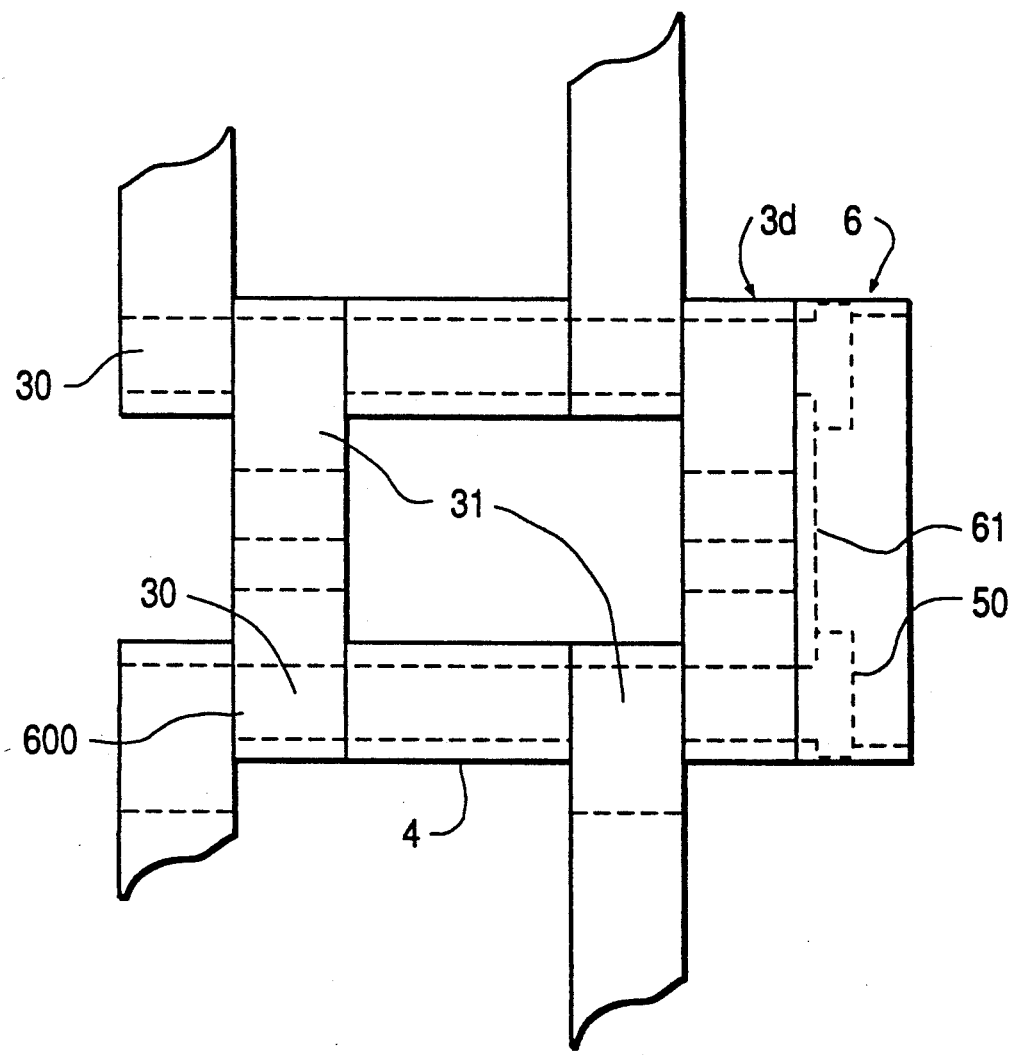
FIG. 13 is an enlarged view of a portion of the conveyor belt shown in circle (B) in FIG. 12.

In a second embodiment of the present invention, as shown in FIGS. 12 and 13, alternating bars 3 of each row 400 can be positioned so that the forward end of one bar, for example bar 3a is disposed adjacent to the rearward end of bar 3b. In other words, opening 30 of bar 3a would be aligned with opening 31 of bar 3b. Similarly, the rearward end of bar 3a can be disposed adjacent to the forward end of bar 3c so that opening 31 of bar 3a is aligned with opening 30 of bar 3c. When bars 3 are in this configuration, each channel 600 initially will be capable of movement in the same direction, instead of alternate channels 600 being capable of movement in the forward and rearward direction as described above in the first embodiment.

Referring again to FIG. 12, edge link 6 can be placed on the ends of adjacent rows 400 defined by channels 600a and 600c as described above and shown in FIGS. 9, 10, and 11. In this embodiment, edge links 6 would be placed on end 50c and 50d first as these ends passed through longitudinal holes 31 of outermost bars 3d. As described above, channel 600c moved toward channel 600a, and also moved toward adjacent rearward channel 600, and thus, every other row 400 moved in opposite directions when placing edge links 6 on the ends of the rods 5. In this embodiment, edge links 6 on both sides of the belt will be disposed adjacent the same row 400 of bars 3, and each row 400 will move in the same direction. In this embodiment, edge links 6 preferably are disposed on rods 5 simultaneously.

In this embodiment, the tension of the conveyor belt will maintain the relative positions of connecting rods 5 to prevent rods 5 from moving in channel 62, and thus prevent the ends of rods 50 from aligning with openings 60 of edge links 6. Thus, ceramic bars 3 are prevented from separating or disengaging from conveyor belt 1. As in the first embodiment, the edge links 6 carry substantially none of the tension of the conveyor belt. Rather, the tension is transferred to adjacent rows of bars 3 through rods 5.

In another embodiment of the invention, longitudinal holes 31 of bars 3 are aligned adjacent one another as shown in FIG. 1. However, edge links 6 are disposed adjacent the same row 400 of bars 3 as shown in FIG. 12, and are disposed on rods 5 simultaneously. In another embodiment, forward hole 30 of bar 3a is aligned with longitudinal hole 31 of bar 3b as shown in FIG. 12, and edge links 6 are disposed adjacent outermost bars 3d to form alternating rows 400 as shown in FIG. 1. Skilled practitioners in the art recognize that the particular configuration of edge links 6 and bars 3 may vary depending on the desired design characteristics such as ease of installation, tension to be carried, and other known result-effective design parameters.

Figure 11B:
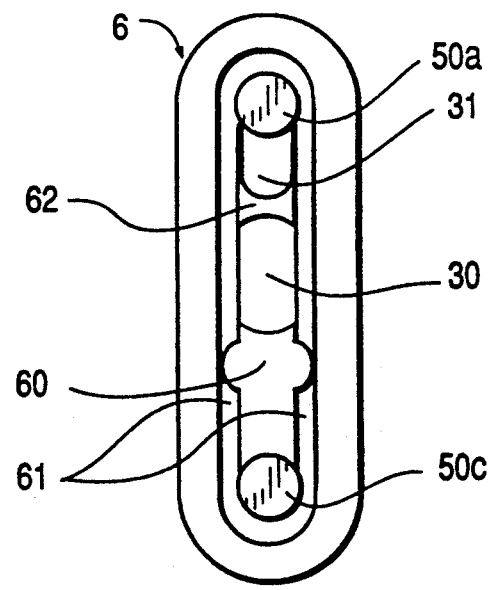

In another embodiment of the invention, edge links 6 may be additionally secured on the conveyor belt by the use of cement putty. After assembly, cement may be disposed in opening 60 to prevent the ends 50 of rods 5 from lining up with the opening as shown in FIG. 11b. Thus, edge links 6 are secured on the rods 5, thereby securing the bars 3 on the rods. Suitable ceramic putties include, but are not limited to a zirconia based liquid cement filled with a silicon carbide based dry refractory cement, or a castable ceramic compound. For example, AREMCO ULTRATEMP 516® filled with CARBO-FRAX#90®, or CERAMACAST646®, could be used.

Due to the fact that no holes are drilled in rods 5, the rods may be economically ground in the fired or hardened state and are not limited in length. Thus, the width of the ceramic belt is not limited and wide belts capable of withstanding temperatures of over 4000° F. may be economically manufactured. The use of cement is not required, although it may be employed as a precautionary measure. In the embodiment shown in FIG. 1, as long as tension is maintained on belt 1, relative movement of the connecting rods 5 is precluded, thereby precluding the ends 50 of connecting rods 5 from lining up with hole 60 of edge links 6. In the embodiment shown in FIG. 12, as long as the tension on the belt 1 is maintained, relative movement of rods 5 and alignment of the rods 5 with hole 60 will be precluded. In both cases, edge links 6 will prevent the ceramic bars 3 from separating and disengaging by themselves. Also, edge links 6 can be designed to prevent ends 50 of rods 5 from protruding outwardly from outer surface 66 of edge link 6 and therefore prevent snagging or tearing of the belt. Finally, edge link 6 is designed so that the length of the channel 62 is slightly greater than the distance between channels 600a and 600c through which rods 5 are disposed, thus substantially preventing edge links 6 from carrying any significant portion of the load produced by the tension in ceramic belt 1.

This invention has been described in detail with respect to the preferred embodiments. These embodiments are merely for example only and the invention is not limited thereto. It will be understood by those skilled in the art that other variations and modifications can easily be made within the scope of this invention as defined by the appended claims.

I claim:

1. A ceramic conveyor belt comprising:
   a plurality of ceramic bars including at least a forward round hole and a rearward longitudinal hole disposed therethrough in opposite ends of said bars, said bars disposed in offset rows such that the forward end of a first bar is disposed adjacent the rearward end of a preceding bar with the forward hole of said first bar aligned with the rearward hole of the preceding bar, and the rearward end of said first bar is disposed adjacent the forward end of a proceeding bar with the rearward hole of said first bar aligned with the forward hole of said proceeding bar to thereby form a column of bars, said belt comprising a plurality of columns of bars and said aligned holes creating a plurality of cross-channels through said columns;

a plurality of ceramic connector rods, one said rod disposed through each said cross-channel and having ends extending beyond the outermost of said columns on either side of said belt, said rods including an indentation formed in each said extending end thereof;

a plurality of ceramic edge links disposed adjacent the outermost of said bars, said edge links having a longitudinal channel disposed therethrough, said channel defined by a ledge and including an enlarged opening through which the ends of said rod may be passed to allow said edge links to be disposed on said rod, said ledge fitting within said indentation to retain said edge links on said rods.

2. The conveyor belt recited in claim 1 further comprising means for preventing said enlarged opening from aligning with said rods after said edge links are disposed on said rods to preclude said edge links from falling off of said rods.

3. The ceramic conveyor belt recited in claim 2, said means for preventing comprising the tension of said belt which substantially precludes relative movement of said rods relative to said longitudinal channel.

4. The ceramic conveyor belt recited in claim 2, said means for preventing comprising putty disposed within said channel and precluding a degree of relative movement between said edge link and said rods sufficient to allow said rods to become aligned with said enlarged opening.

5. The ceramic conveyor belt recited in claim 2, wherein the driving force of said belt is transferred primarily from said rods to said ceramic bars such that substantially none of the tension of said belt is applied to said edge links.

6. The ceramic conveyor belt recited in claim 2, the overall length of said longitudinal channel being greater than the longitudinal distance between adjacent rods when said belt is under tension.

7. The ceramic conveyor belt recited in claim 2, said means for preventing comprising said enlarge opening being disposed adjacent a portion of the outermost bars through which no hole is disposed so as to preclude said rods from aligning with said holes.

8. A ceramic conveyor belt comprising:
a plurality of ceramic bars including at least a forward round hole and a rearward longitudinal hole disposed therethrough in opposite ends of said bars, said bars disposed in offset rows such that the forward end of a first bar is disposed adjacent the forward end of a preceding bar with the forward hole of said first bar aligned with the forward hole of the preceding bar, and the rearward end of said first bar is disposed adjacent the rearward end of a proceeding bar with the rearward hole of said first bar aligned with the rearward hole of said proceeding bar to thereby form a column of bars, said belt comprising a plurality of columns of bars and said aligned holes creating a plurality of cross-channels through said columns;
a plurality of ceramic connector rods, one said rod disposed through each said cross-channel and having ends extending beyond the outermost of said columns on either side of said belt, said rods including an indentation formed in each said extending end thereof; and
a plurality of ceramic edge links disposed adjacent the outermost of said bars, said edge links having a longitudinal channel disposed therethrough, said channel defined by a ledge and including an enlarged opening through which the ends of said rod may be passed to allow said edge links to be disposed on said rod, said ledge fitting within said indentation to retain said edge links on said rods.

9. The conveyor belt recited in claim 8 further comprising means for preventing said enlarged opening from aligning with said rods after said edge links are disposed on said rods to preclude said edge links from falling off said rods.

10. The ceramic conveyor belt recited in claim 9, said means for preventing comprising the tension of said belt which substantially precludes relative movement of said rods relative to said longitudinal channel.

11. The ceramic conveyor belt recited in claim 9, said means for preventing comprising putty disposed within said channel and precluding a degree of relative movement between said edge link and said rods sufficient to allow said rods to become aligned with said enlarged opening.

12. The ceramic conveyor belt recited in claim 9, wherein the driving force of said belt is transferred primarily from said rods to said ceramic bars such that substantially none of the tension of said belt is applied to said edge links.

13. The ceramic conveyor belt recited in claim 9, the overall length of said longitudinal channel being greater than the longitudinal distance between adjacent rods when said belt is under tension.

14. The ceramic conveyor belt recited in claim 9, said means for preventing comprising said enlarged opening being disposed adjacent a portion of the outermost bars through which no hole is disposed so as to preclude said rods from aligning with said holes.

* * * * *